United States Patent
Zhao et al.

(10) Patent No.: US 9,485,668 B2
(45) Date of Patent: Nov. 1, 2016

(54) METHOD AND ARRANGEMENT FOR CONFIGURING MANAGED OBJECT MODEL FOR COMBINED CELL

(75) Inventors: Yufeng Zhao, Upplands Väsby (SE); Leif Arnerdal, Solna (SE); Per Ståhle, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 52 days.

(21) Appl. No.: 14/427,140

(22) PCT Filed: Sep. 14, 2012

(86) PCT No.: PCT/SE2012/050975
§ 371 (c)(1),
(2), (4) Date: Mar. 10, 2015

(87) PCT Pub. No.: WO2014/042567
PCT Pub. Date: Mar. 20, 2014

(65) Prior Publication Data
US 2015/0245222 A1    Aug. 27, 2015

(51) Int. Cl.
*H04W 40/00* (2009.01)
*H04W 16/22* (2009.01)
*H04W 16/18* (2009.01)
*H04W 16/32* (2009.01)

(52) U.S. Cl.
CPC ............. *H04W 16/22* (2013.01); *H04W 16/18* (2013.01); *H04W 16/32* (2013.01)

(58) Field of Classification Search
USPC ............................ 455/446, 447, 67; 370/329
See application file for complete search history.

(56) References Cited

U.S. PATENT DOCUMENTS

| 6,212,388 | B1* | 4/2001 | Seo ..................... H04W 16/10 370/329 |
| 9,288,690 | B2* | 3/2016 | Brueck ................ H04W 24/02 |
| 2004/0158836 | A1 | 8/2004 | Adkins et al. |
| 2005/0125515 | A1 | 6/2005 | Dufour et al. |
| 2006/0294214 | A1 | 12/2006 | Chou |

(Continued)

FOREIGN PATENT DOCUMENTS

| EP | 1 799 000 | 6/2007 |
| WO | WO 2012/000032 | 1/2012 |

OTHER PUBLICATIONS

International Search Report for International application No. PCT/SE2012/050975, Aug. 26, 2013.

(Continued)

*Primary Examiner* — David Q Nguyen
(74) *Attorney, Agent, or Firm* — Baker Botts, LLP

(57) ABSTRACT

The invention relates to an arrangement and a method for configuring MO models for a cell hosted by an RBS. The cell is served by a plurality of transmission points, where each transmission point is covering a subarea of the cell. The cell is modeled by an instance of a first MO. A set of equipment of each transmission point is modeled by an instance of a second MO. The method comprises adding (110) an instance of a third MO for each subarea comprising attributes defining the usage of the transmission point covering the subarea. The method also comprises defining (120) relationships between the instance of the first MO and each instance of the third MOs, and defining (130) a relationship between the added instance of the third MO and the instance of the second MO modeling the set of equipment of the transmission point covering the corresponding subarea. FIG. 10.

12 Claims, 13 Drawing Sheets

(56) References Cited

U.S. PATENT DOCUMENTS

2012/0157002 A1* 6/2012 Choi ................ H04W 52/0206
455/67.11
2013/0029674 A1* 1/2013 Arad ..................... H04W 16/02
455/447

OTHER PUBLICATIONS

PCT Written Opinion of the International Searching Authority for International application No. PCT/SE2012/050975, Aug. 23, 2013.

Extended European Search Report Pursuant to Rule 62 EPC for Application No. / Patent No. 12884489.1-1857 / 2896236 PCT/SE2012050975—Mar. 16, 2016.
3GPP TS 32.792 V10.0.0; Technical Specification; 3rd Generation Partnership Project; Technical Specification Group Services and System Aspects; Telecommunication management; Generic Radio Access Network (RAN) Network Resource Model (NRM) Integration Reference Point (IRP); Information Service (IS) (Release 10)—Jun. 2011.

\* cited by examiner

METHOD AND ARRANGEMENT FOR CONFIGURING MANAGED OBJECT MODEL FOR COMBINED CELL

PRIORITY

This nonprovisional application is a U.S. National Stage Filing under 35 U.S.C. §371 of Internatinoal Patent Application Serial No. PCT/SE2012/050975, filed Sep. 14, 2012, and entitled "METHOD AND APPANGEMENT FOR CONFIGURING MANAGED OBJECT MODEL FOR COMBINED CELL".

TECHNICAL FIELD

The disclosure relates to managed object models, and more specifically to a method and arrangement for configuring managed object models for a cell served by a plurality of transmission and receiving points.

BACKGROUND

3GPP Long Term Evolution (LTE) is the fourth-generation mobile communication technologies standard developed within the 3$^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a User Equipment (UE) is wirelessly connected to a Radio Base Station (RBS) commonly referred to as an evolved NodeB (eNodeB) in LTE. An RBS is a general term for a radio network node capable of transmitting radio signals to a UE and receiving signals transmitted by a UE. The eNodeB is a logical node in LTE and the RBS is a typical example of a physical implementation of an eNodeB.

FIG. 1 illustrates a radio access network in an LTE system. An eNodeB 101a serves a UE 103 located within the eNodeB's geographical area of service also called a cell 105a. The eNodeB 101a is directly connected to the core network (not illustrated). The eNodeB 101a is also connected via an X2 interface to a neighboring eNodeB 101b serving another cell 105b. Although the eNodeBs of this example network serves one cell each, an eNodeB may serve more than one cell.

The use of a so called heterogeneous deployment or heterogeneous network consisting of radio network nodes transmitting with different transmit power and operating within overlapping coverage areas, is an interesting deployment strategy for cellular networks. In such a deployment schematically illustrated in FIG. 2a, low-power nodes such as pico nodes 210 are typically assumed to offer high data rates measured in Mbit/s, as well as to provide high capacity e.g. measured in users/m2 or in Mbit/s/m2, in the local areas where this is needed or desired. High-power nodes, often referred to as macro nodes 220, are assumed to provide full-area coverage. In practice, the macro nodes 220 may correspond to currently deployed macro cells 221, while the pico nodes 210 are later deployed nodes, extending the capacity and/or achievable data rates in a pico cell 211 within the macro cell 221 coverage area where needed. Pico nodes and macro nodes may also be referred to as pico RBSs and macro RBSs respectively.

In a traditional heterogeneous deployment, schematically illustrated in FIG. 2b, a macro node 220 creates a macro cell 221 and each pico node 210 creates a cell of its own, a so called pico cell 211. This means that, in addition to downlink and uplink data transmission and reception on the pico link 213 maintained between the pico node 210 and the wireless device 212, the pico node 210 also transmits the full set of common signals and channels associated with a cell. In an LTE context this includes the primary and secondary synchronization signals, cell-specific reference signals, and system information (SI) related to the cell, in FIG. 2b referred to as SI pico and illustrated by a cell with a dashed line overlying the pico cell 211.

Alternatively, a terminal or wireless device 212 in the range of a pico node 210, i.e. in the subarea 214 covered by the pico node, may be simultaneously connected to both a macro node 220 and the pico node 210 as illustrated in FIG. 3. To the macro node 220, covering the subarea 222, the terminal 212 maintains a connection or link, e.g. used for radio-resource control (RRC) such as mobility. The connection or link maintained to the macro node 220 may be referred to as an anchor link 223. Furthermore, the terminal 212 maintains a connection or link to the pico node 210, used primarily for data transmission. The connection or link maintained to the pico node 210 may be referred to as a booster link 213.

This approach may be referred to as a combined cell or soft cell approach. In the following it will be referred to as the combined cell approach. The SI related to the combined cell is in FIG. 3 referred to as SI and is illustrated by a cell with a dashed line overlying the subarea 222.

The combined cell approach has several benefits such as mobility robustness and improved energy efficiency. Since the macro layer is responsible for providing e.g. system information and basic mobility management, the pico node in essence only needs to be active when transmitting data to the terminal. This can lead to significant gains in energy efficiency and an overall reduction in interference as the pico nodes can be silent in periods of no data transmission activity. Macro and pico node transmission can either occur on different frequencies in a frequency-separated deployment, or on the same frequency in a same-frequency deployment.

The distinction between cell and transmission and receiving points, often referred to simply transmission points, is an important aspect of the combined cell approach. Each cell has a unique cell identity from which the Cell specific Reference Signal (CRS) is derived. With the cell identity information, a terminal can derive the CRS structure of the cell and obtain the SI it needs to access the network. A transmission point on the other hand is simply one or more collocated antennas from which a terminal can receive data transmissions in a certain area. As a conclusion, a cell may be deployed with one or several antennas or transmission points covering the cell area. In the latter case, the cell is thus served by a plurality of transmission points where each transmission point covers a subarea of the cell.

Configuration of combined cell deployments as well as combinations of such cell deployments with other cell deployments are in LTE done using the following Managed Objects (MO) in a MO model, also illustrated in FIG. 4 (see 3GPP TS 32.792 V10.0.0 (2011-06) and 3GPP TS 32.762 V11.2.0 (2012-06)). A MO may also be referred to as an Information Object Class (IOC):

40: ENodeBFunction—This MO represents eNodeB functionality.

41: EUtranCell—This MO represents the properties of E-UTRAN cell. A cell is a radio network object that can be uniquely identified by a UE from a cell identification that is broadcasted over a geographical area from one UTRAN Access Point. The usage of a sectorEquipmentFunction is defined by attributes in EUtranCell, e.g. the attribute partOfSectorPower. The relation between the ENodeBFunction and the EUtranCell is in FIG. 4 illustrated by the 1 and the star * and the line between the two MOs, which means that one (1) ENodeBFunction may be related to many (*) EUtranCell. The small black rhomb at the end of the line means that the EUtranCell is contained in the ENodeBFunction.

42: SectorEquipmentFunction—This MO represents a set of cells within a geographical area that has common functions relating to AntennaFunction, Tower Mounted Amplifier (TMA) Function, and supporting equipment such as power amplifier. SectorEquipmentFunction thus represents a set of equipment that the set of cells can use. However, the usage of the SectorEquipmentFunction is defined by the EUtranCell. An EUtranCell can only have one SectorEquipmentFunction, as illustrated by the star * and the 1 between the two MOs in the FIG. 4.

44: AntennaFunction—This MO represents an array of radiating elements that may be tilted to adjust the RF coverage of a cell(s).

43: TmaFunction—This MO represents a TMA or a number of TMA subunits within one TMA, each separately addressable by a specific index at the application layer.

As already described above, FIG. 3 shows a cell configuration with a cell that has several subareas 214, 222, served by two different transmission points 210, 220 using different output power. With the currently existing model, the equipment of both transmission points of this cell would be modeled by one SectorEquipmentFunction and would thus be treated as one single set of equipment in the RBS, as it is only possible for one EUtranCell to have one SectorEquipmentFunction. Furthermore, the usage of the SectorEquipmentFunction is specified by one set of attributes in the EUtranCell A drawback with the current MO model is thus that both antennas/transmission points 210, 220, would have to be configured with e.g. the same output power, the same transmission mode, and the same status. The model is thus not flexible enough to support modeling of combined cell deployments.

SUMMARY

It is therefore an object to address some of the problems outlined above, and to provide a solution making it possible to configure an MO model for e.g. combined cells where the cell is served by a plurality of transmission points, each covering a subarea of the cell. It should thus be possible to differentiate the usage of the equipment of the different transmission points with regards to e.g. output power. This object and others are achieved by the method and the arrangement according to the independent claims, and by the embodiments according to the dependent claims.

In accordance with a first aspect of the invention, a method for configuring MO models for a cell hosted by a first RBS is provided. The cell is served by a plurality of transmission and receiving points. Each transmission and receiving point is covering a subarea of the cell. The cell is modeled by an instance of a first MO in a first MO model. A set of equipment of each of said plurality of transmission and receiving points is modeled by an instance of a second MO in the first MO model. The method comprises adding to the first MO model an instance of a third MO for each subarea, each instance of the third MO comprising attributes defining the usage of the transmission and receiving point covering the subarea. The method also comprises defining relationships between the instance of the first MO and each instance of the third MOs. When an added instance of the third MO is modeling a subarea covered by a transmission and receiving point managed by the first RBS, the method comprises defining a relationship between the added instance of the third MO and the instance of the second MO modeling the set of equipment of the transmission and receiving point covering the corresponding subarea.

In accordance with a second aspect of the invention, an arrangement for configuring MO models for a cell hosted by a first radio base station is provided. The cell is served by a plurality of transmission and receiving points, each transmission and receiving point covering a subarea of the cell. The cell is modeled by an instance of a first MO in a first MO model, and a set of equipment of each of said plurality of transmission and receiving points is modeled by an instance of a second MO in the first MO model. The arrangement comprises a processing circuit configured to add to the first MO model an instance of a third MO for each subarea, each instance of the third MO comprising attributes defining the usage of the transmission and receiving point covering the subarea. The processing circuit is also configured to define relationships between the instance of the first MO and each instance of the third MOs. The processing circuit is further configured to define a relationship between an added instance of the third MO and the instance of the second MO modeling the set of equipment of the transmission and receiving point covering the corresponding subarea, when the added instance of the third MO is modeling a subarea covered by a transmission and receiving point managed by the first RBS.

An advantage of embodiments of the invention is that they allow for a flexible configuration of a cell using multiple antennas covering different subareas, with different cell attributes per subarea, such as frequency, output power, number of transmission and receiving (Tx/Rx) branches, and transmission mode. The configuration of combined cell deployments is thus supported.

Another advantage of embodiments of the invention is that it is possible to configure a cell using antenna resources in multiple RBSs.

A further advantage of embodiments of the invention is that it makes it possible to configure different states for different subareas of a cell, and to manage individual subareas of a cell. In one example, the configured MO model makes it possible to give a different state to a pico node which is disabled when there is no UE close to it in order to save energy. In another example, the shutting down of one subarea would not affect other subareas in the same cell as subareas may be individually managed.

Other objects, advantages and features of embodiments will be explained in the following detailed description when considered in conjunction with the accompanying drawings and claims.

DETAILED DESCRIPTION

Figure 1:
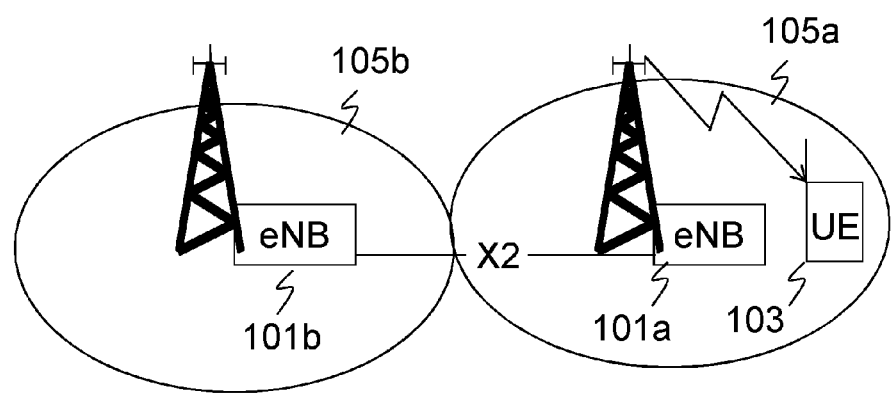
FIG. 1 is a schematic illustration of a radio access network in LTE.
Figure 2A:
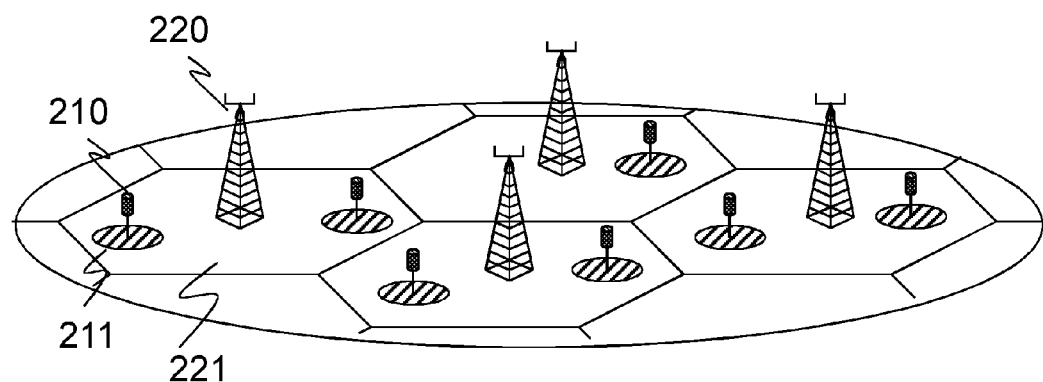
FIG. 2a is a schematic illustration of a heterogeneous deployment with higher-power macro nodes and lower-power pico nodes.
Figure 2B:
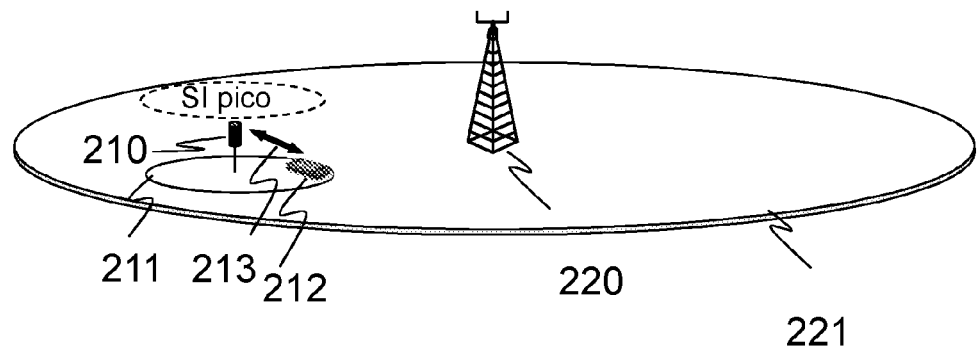
FIG. 2b is a schematic illustration of a traditional pico cell.
Figure 3:
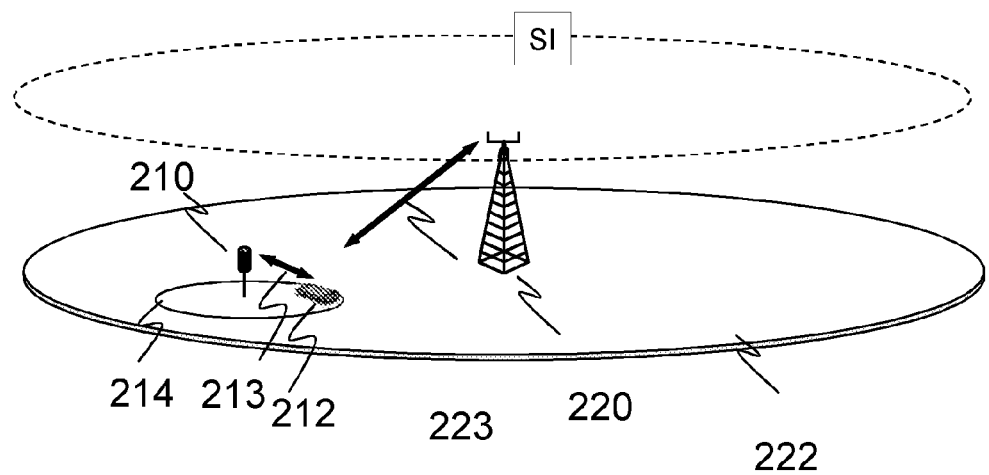
FIG. 3 is a schematic illustration of the combined cell approach.
Figure 4:
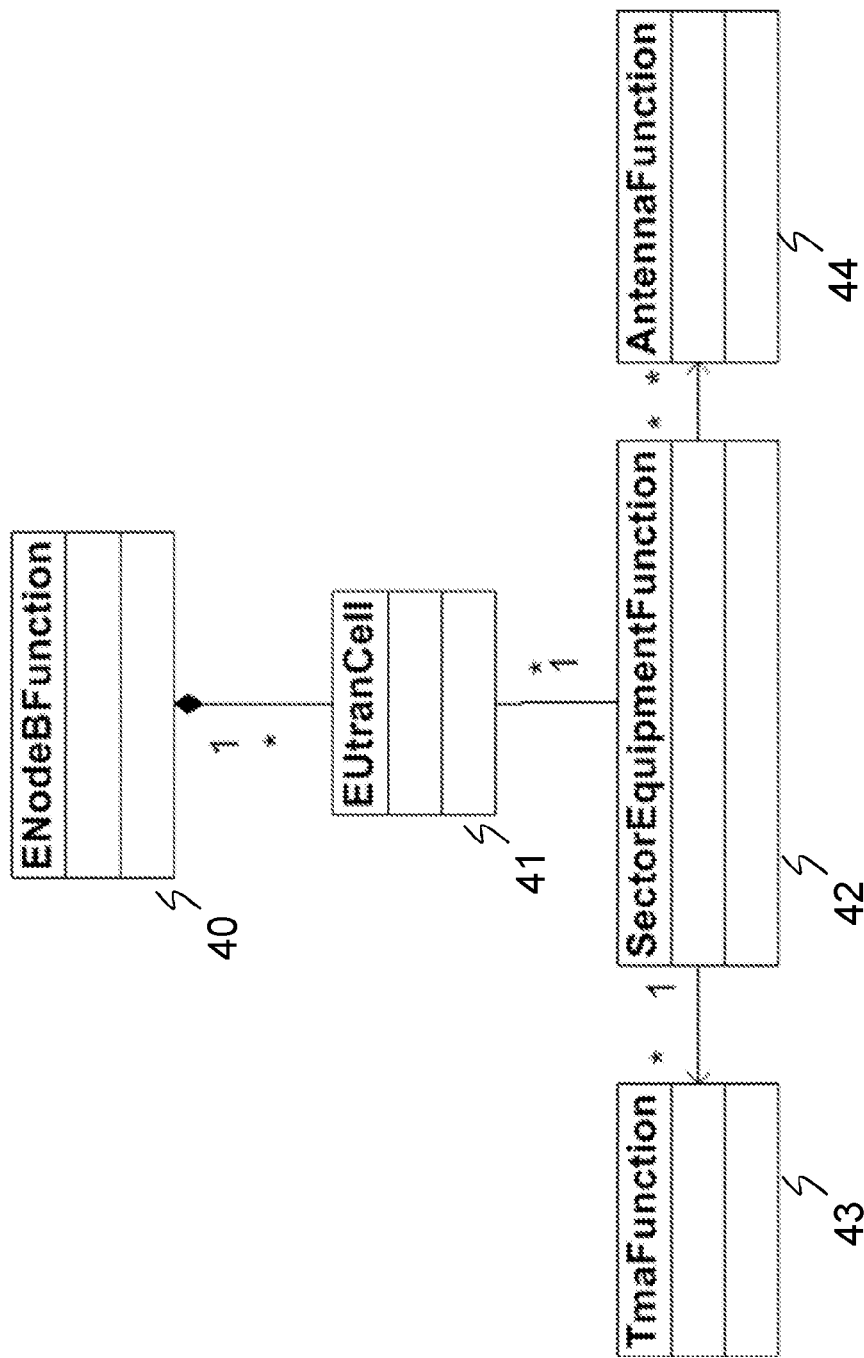
FIG. 4 is a schematic illustration of a 3GPP MO model of a traditional cell in LTE.

In the following, different aspects will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the invention are primarily described in the form of methods and nodes, they may also be embodied in a computer program product as well as in a system comprising a computer processor and a memory coupled to the processor, wherein the memory is encoded with one or more programs that may perform the functions disclosed herein.

Embodiments are described in a non-limiting general context in relation to example scenarios of cell deployments for E-UTRAN. However, it should be noted that the embodiments may be applied to any radio access network technology supporting cells served by a plurality of transmission points covering different subareas of the cell.

The problem of the lack of flexibility in existing 3GPP MO model, which does for example not support network configuration of combined cell deployments, is addressed by a solution where the creation of the MO model is adapted so that the model can be used for the configuration of a cell served by a plurality of transmission points. This is achieved by providing a new MO in the model to model a subarea of a cell. The new MO is called a SectorCarrier MO or a third MO hereinafter.

In an instantiated model, an instance of the SectorCarrier MO is added for each subarea of the cell. The SectorCarrier MO instances are related to an instance of the EUtranCell MO, also called the first MO. Furthermore, each SectorCarrier MO instance is related to an instance of a SectorEquipmentFunction MO also called the second MO.

A cell that will cover an area that is put together of a number of subareas will use one SectorCarrier MO instance per subarea to define how the cell behaves in that particular subarea. The SectorCarrier MO instance defines the usage of a set of physical equipment such as radio units and antennas represented by the SectorEquipmentFunction MO instance, e.g., frequency, output power, and number of Tx/Rx branches in a transmission point. Furthermore, to support energy saving and fault tolerance, different SectorCarrier MO instances can have different states so that failure or power down of one subarea won't affect other ones.

A flexible configuration of a cell using multiple antennas covering different subareas, with different cell attributes per subarea, such as frequency, output power, number of transmission and receiving (Tx/Rx) branches, and transmission mode, is thus provided.

Figure 5:
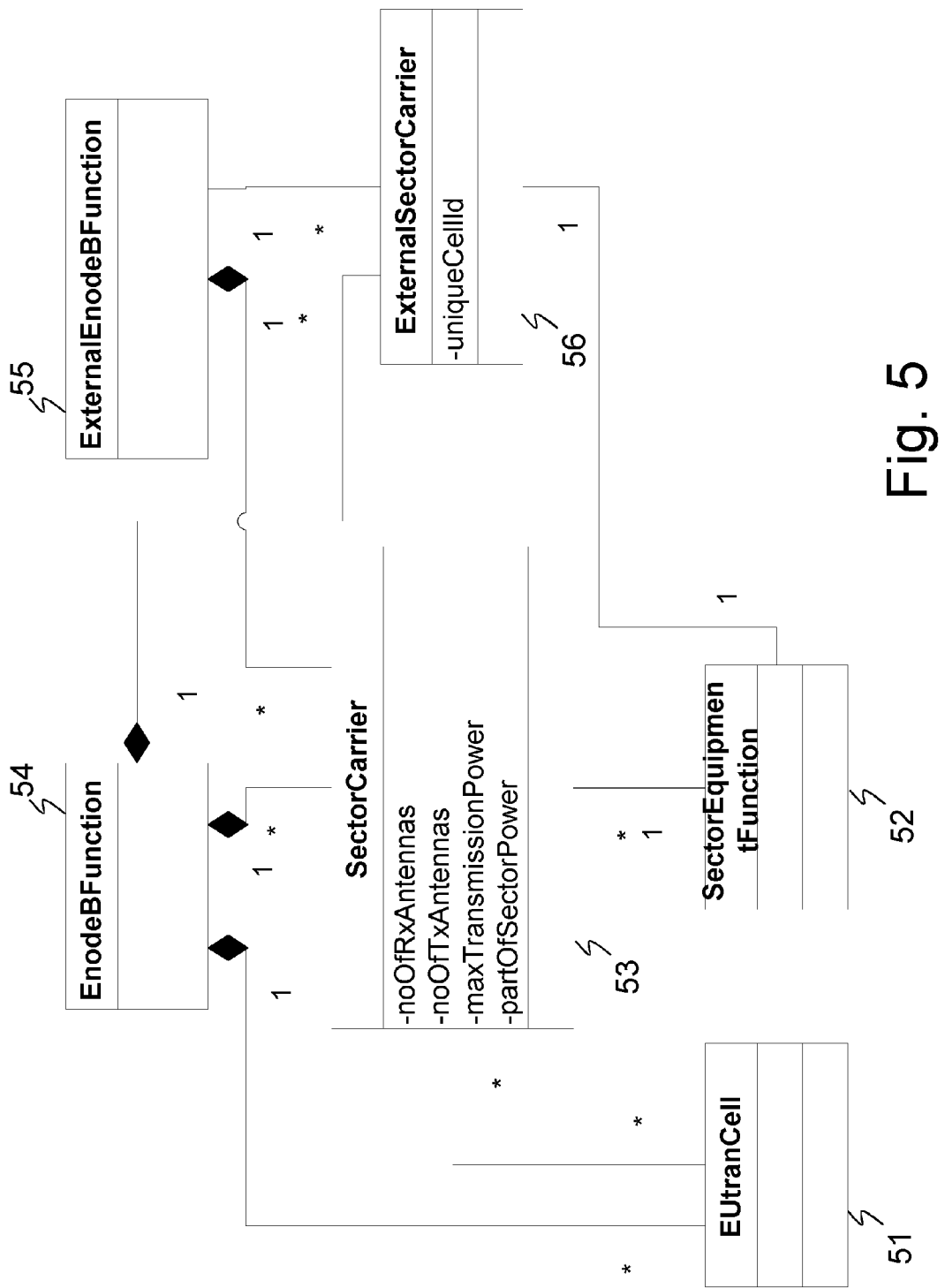
FIG. 5 is a schematic illustration of an MO model according to embodiments of the invention.

Embodiments of the invention support multiple coverage areas or subareas in a cell, as well as several cells that share the same physical equipment of a transmission point. Furthermore, configuration of a cell that uses transmission points managed by more than one RBS is supported. This is done by adding a relation between an instance of a SectorCarrier MO/third MO and an instance of an ExternalENodeBFunction MO, also referred to as the fourth MO. It is thereby specified that the equipment modeled by the SectorEquipmentFunction MO instance related to the SectorCarrier MO instance correspond to a transmission point managed by another RBS than the RBS hosting the cell. FIG. 5 illustrates what the MO model will look like over the Interface-N (Itf-N) interface, which is the interface defined in 3GPP between a vendor independent Network Management System (NMS) and a vendor specific domain manager. In such an illustration of an MO model, the stars * and the ones 1 on the lines connecting the MOs illustrate the logical relationships between the MOs. The relationship may e.g. be a one-to-many relationship, 1-*, a many-to-many relationship, *-*, or a one-to-one relationship, 1-1. The rhombs at the end of some of the connecting lines indicate the MO to which the rhomb is attached contains the MO at the other side of the connecting line. This way of illustrating relations is also used in FIGS. 8a-b and 9b described below.

The SectorCarrier MO 53 contains the attributes needed to configure how the radio and antenna resources shall be used by the cell in the specific area and is related to the SectorEquipmentFunction MO 52. The ExternalSectorCarrier MO 56 contains a uniqueCellId attribute to be able to configure which cell the resources belongs to when the resources are managed by one RBS and the cell by another RBS. The MO model in FIG. 5 also comprises the EnodeBFunction MO 54 modeling the first RBS hosting the cell. The cell is modeled by the EUtranCell MO 51, and the ExternalEnodeBFunction MO 55 is modeling a second RBS managing one or more of the transmission points covering the cell.

Using radio and antenna resources in multiple RBSs will require control signaling between these RBSs to manage both setting up the resources in the remote RBS but also to manage the UE when moving around in the cell and thus being connected to different antennas. This data can be sent over the RBS to RBS interface, referred to as the X2 interface in LTE. Other data that can be sent over this interface is observability data like cell trace and UE trace data.

The configuration of a network involves both NMS as well as one or several Domain Mangers or Operation and Maintenance (OAM) systems, depending on how many RBSs the Combined Cell is deployed in.

Figure 6A:
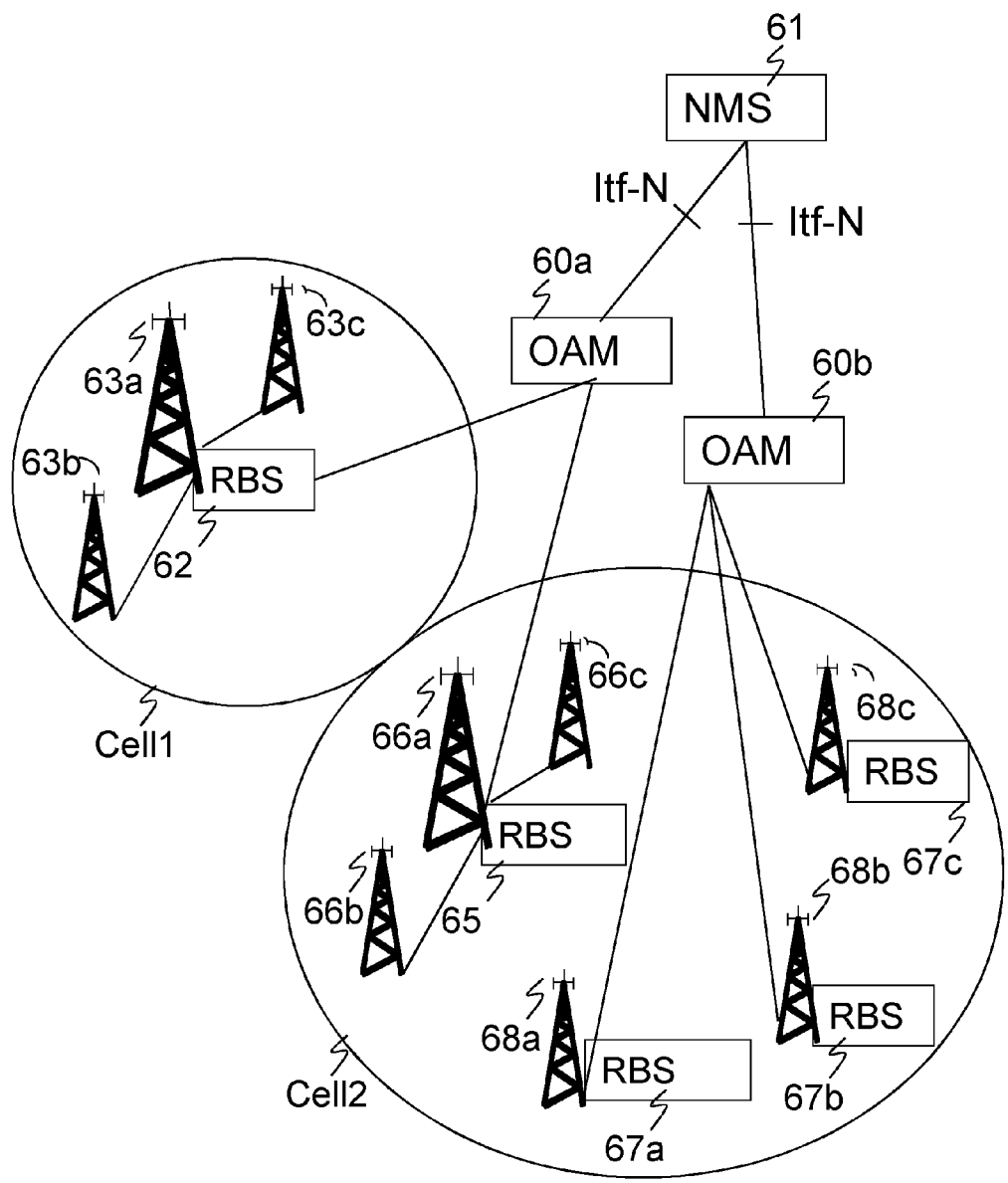
FIG. 6a is a schematic illustration of management systems and RBSs involved in one example of a combined cell deployment.

FIG. 6a shows a radio network where cells are deployed on multiple antennas, a so called combined cell deployment. For Cell1 the antennas or transmission points 63a-c are managed by one RBS 62, and for Cell2 the antennas, 66a-c, 68a-c, are managed by multiple RBSs, 65 and 67a-c. Cell 2 has one macro RBS 65 and multiple pico RBSs 67a-c. In the Cell2 scenario one OAM system 60a manages the macro RBS 65 and another OAM system 60b manages the pico RBSs 67a-c. Both OAM systems 60a-b are connected to an NMS 61 via Itf-N. How to configure a deployment such as the Cell2 deployment is described hereinafter with reference to the signaling diagram in FIG. 6b. It should be noted that only one of the pico RBSs 67a in FIG. 6a, is included in the configuration described in FIG. 6b for the sake of simplicity.

Figure 6B:
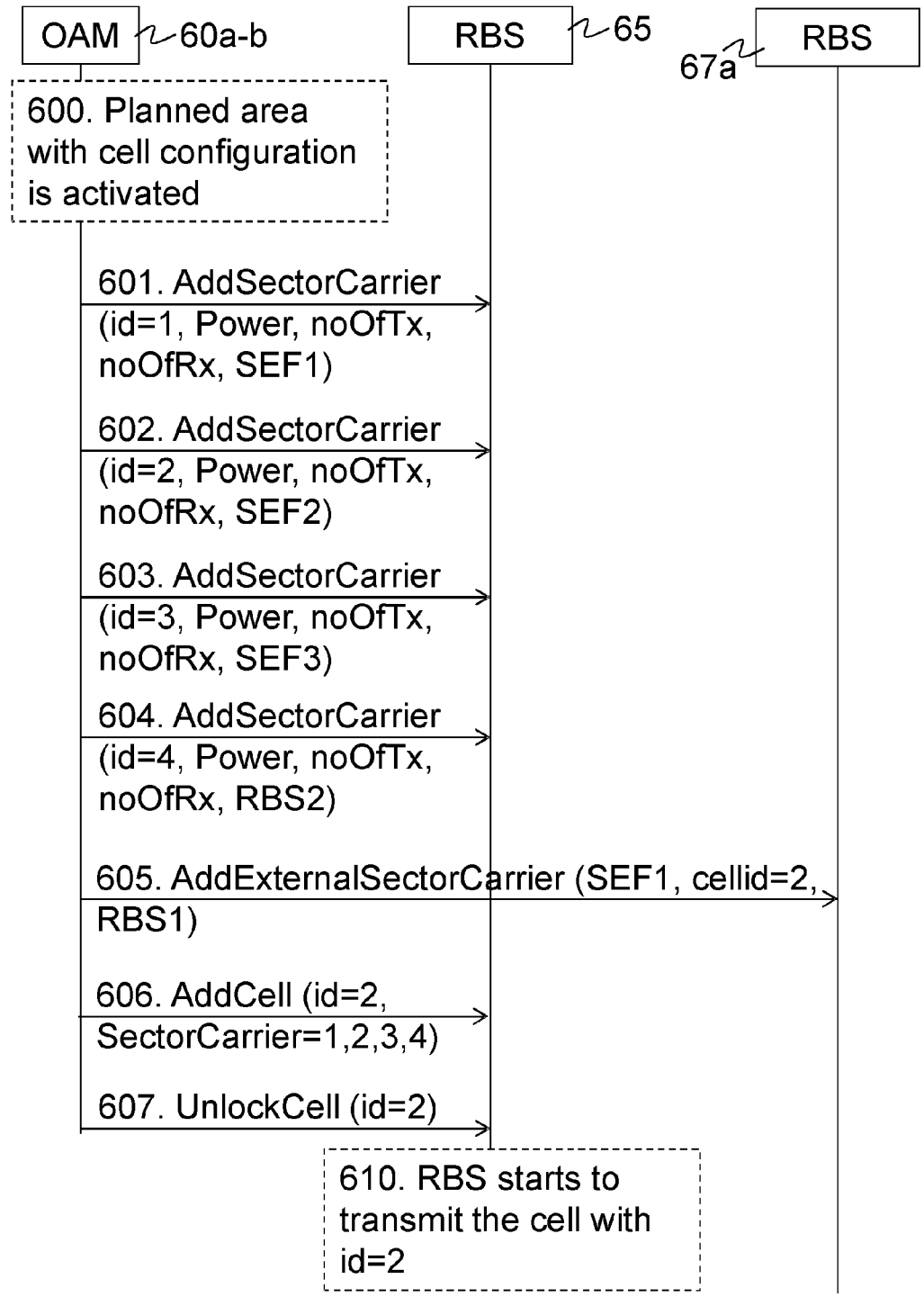
FIG. 6b is a signaling diagram giving an overview of a configuration of a combined cell deployment.

An operator first makes a cell planning in a cell planning tool where one cell is distributed over multiple antennas or transmission points with different output power and possibly also different numbers of Tx/Rx branches for each antenna. In the cell planning tool, the number of sectors in a cell, the sector power and the number of Tx/Rx antennas are determined and are stored in a planned area. Cell and node configuration data from the planned area in the cell planning tool is activated 600 in the OAM systems 60a and 60b, and is then sent to the corresponding RBSs 65, 67a, as illustrated in FIG. 6b. In signals 601-603, a SectorCarrier MO instance for each subarea/sector of Cell2, as illustrated in FIG. 6a, is added to the model in the macro RBS 65 hosting Cell2. Signals 601-603 comprise attributes id=x indicating the identity of the SectorCarrier MO instance, Power indicating a power level of the corresponding transmission point 66a-66c, noOfTx/noOfRx indicating the number of TX/RX receiving branches of the transmission point, and SEFx indicating the relation to a specific SectorEquipmentFunction MO instance. In signal 604, a SectorCarrier MO instance is added for the subarea covered by the transmission point managed by the pico RBS 67a. Signal 604 comprises the same first attributes as described above for signal 601-603 (id=x, Power, noOfTx/noOfRx) identifying the MO instance and defining the usage of the transmission point. However, this instance of the SectorCarrier MO is not related to a SectorEquipmentFunction MO instance as the first three are, but to the second RBS 67a, which is indicated by the last attribute RBS2 of the signal 604. In signal 605, the corresponding ExternalSectorCarrier MO instance is added to the MO model in the second RBS 67a, carrying an attribute indicating the identity of the cell, cell id=2, to which the resource belongs. The signal 605 also comprises the attributes SEF1 and RBS1 indicating the relationship to a SectorEquipmentFunction MO instance and to an ENodeBFunction MO instance respectively. In signal 606, the instance of the EUtranCell MO modeling the Cell2 is added. The attributes are id=2 indicating an identity of the cell modeled by the EUtranCell MO instance, and SectorCarrier=1,2,3,4 indicating the relation to the corresponding SectorCarrier MO instances. In signal 607, the configuration of Cell2 is followed by an unlocking of Cell2. The attribute id=2 indicates the identity of the cell that should be unlocked. This means that the RBS 65, in 610, may start to transmit the Cell2 on the transmission points, 66a-c, 68a, that it is configured to use with e.g. individual power settings for each transmission point. In FIG. 6b the two OAM systems 60a and 60b are grouped together in one box. Signal 605 is e.g. sent from OAM system 60b connected to the RBS 67a, while the other signals in the figure are sent from OAM system 60a.

Figure 7:
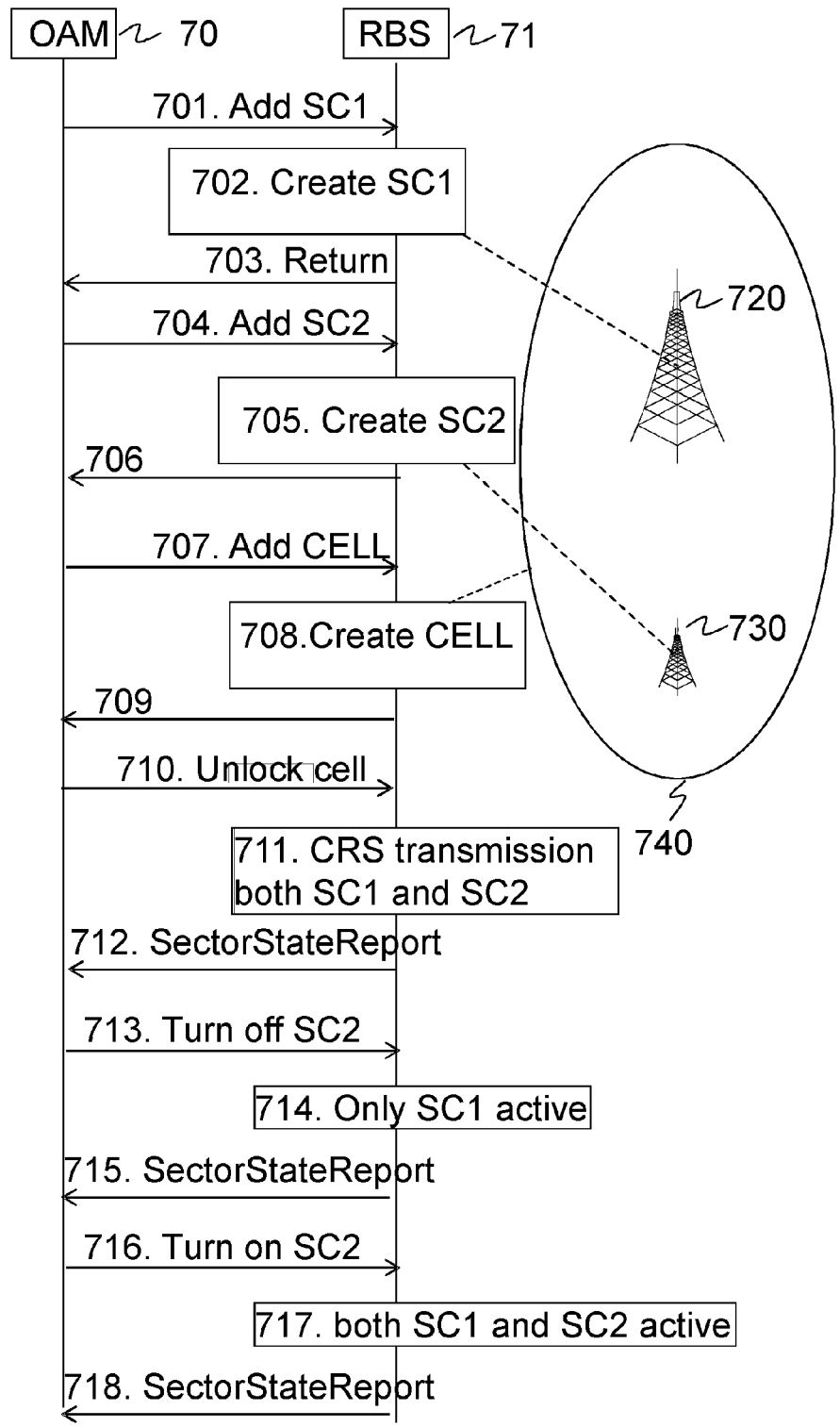
FIG. 7 is a signaling diagram illustrating the configuration and operation of a cell with two sector carriers.

FIG. 7 is a signaling diagram illustrating how to configure and run a cell 740 in an RBS 71, the cell 740 having two transmission points 720 and 730 corresponding to a SectorCarrier each. The following signals are sent from the OAM system 70 to the RBS 71 as part of the configuration:

701: Add SC1—A first SectorCarrier MO instance SC1 is to be added in the model. In 702, the SC1 is created in the MO model in the RBS 71 and is related to the SectorEquipmentFunction MO instance that models one of the transmission points 720.
  703: Return—A return signal is sent back to the OAM system 70 to confirm the creation.
  704: Add SC2—A second SectorCarrier MO instance SC2 is to be added. In 705, the SC2 is created in the MO model and is related to the SectorEquipmentFunction MO instance that models the other one of the transmission points 730.
  706: Return—A return signal is sent back to the OAM system 70 to confirm the creation.
  707: Add CELL—An EUtranCell MO instance CELL is to be added. The relationship to the two SectorCarrier MO instances is indicated in the signal. In 708, the CELL is created in the MO model and is related to the two created SectorCarrier MO instances SC1 and SC2.
  709: Return—A return signal is sent back to the OAM system 70 to confirm the creation.

The configuration of the RBS 71 is hereby finalized. The following signals are then sent between the OAM system 70 and the RBS 71 to run the cell 740:

710: Unlock cell—The RBS is told to unlock the cell. In 711 the RBS starts transmitting from both transmission points in accordance with the configured model of the cell 740.
  712: SectorStateReport—A Sector State Report is returned to the OAM system to confirm that the cell is running.
  713: Turn off SC2—In order to save power, one of the transmission points 730 corresponding to SectorCarrier MO instance SC2 may be turned off. In 714, only the transmission point 720 corresponding to the SectorCarrier MO instance SC1 is active and transmitting/receiving data.
  715: SectorStateReport—A Sector State Report is returned to the OAM system to confirm that only one transmission point is active.
  716: Turn on SC2—The RBS is told to turn on the transmission point 730 corresponding to SectorCarrier MO instance SC2 again, and in 717 both transmission points 720, 730, corresponding to SectorCarrier Mo instances SC1 and SC2 are active.
  718: SectorStateReport—A Sector State Report is returned to the OAM system to confirm that both transmission points are active again.

Figure 8A:
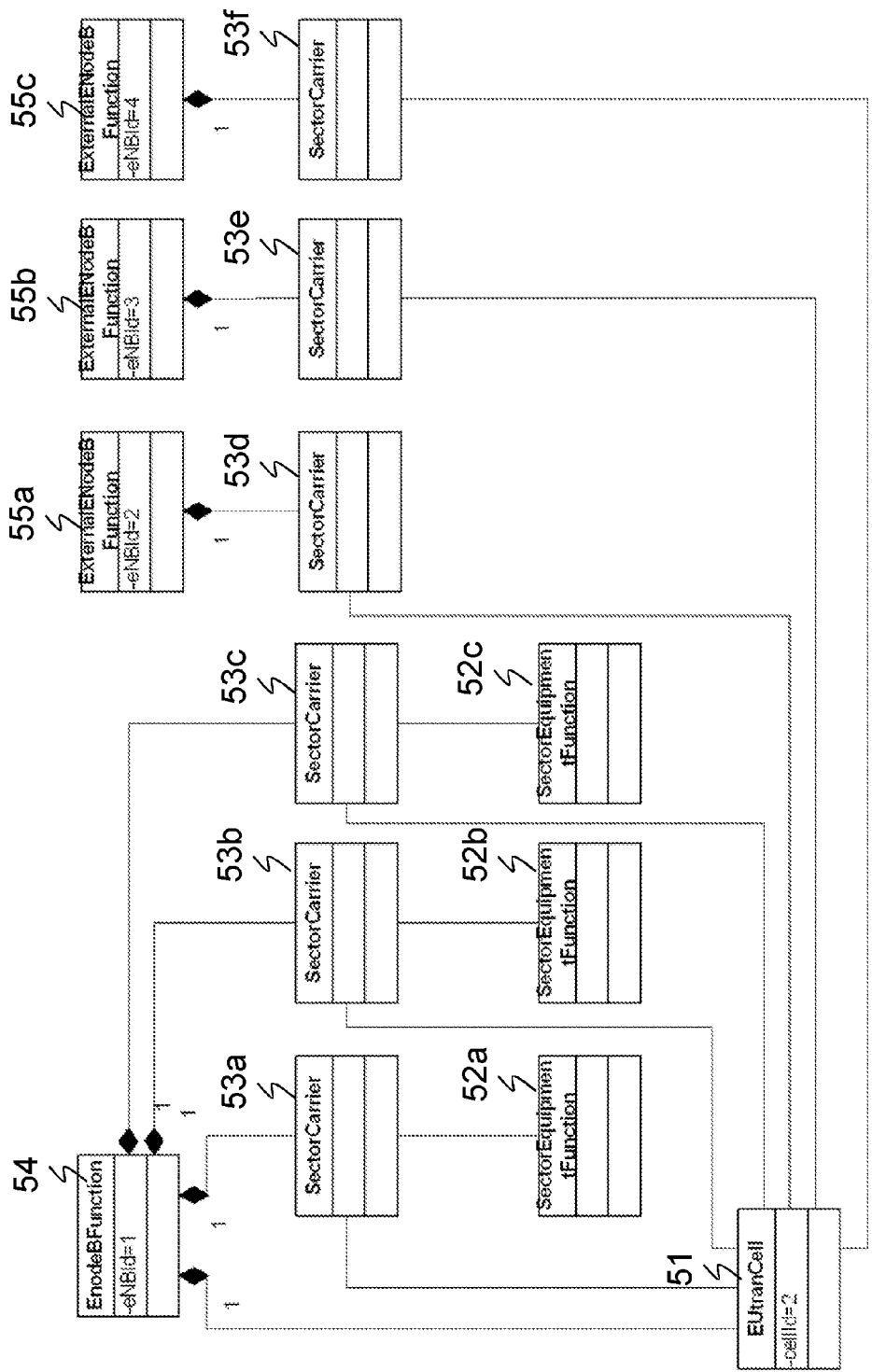
FIGS. 8a-b are schematic illustrations of MO models according to embodiments of the invention.

FIG. 8a illustrates the instantiated MO model in OAM 60a used for the configuration of Cell2 in RBS 65 which is the RBS hosting Cell2 as illustrated in FIG. 6a. The instantiated MO model comprises an instance of the SectorCarrier MO for each transmission point, 66a-c and 68a-c, i.e. six instances of the SectorCarrier MO 53a-f. All six SectorCarrier MO instances are related to an EUtranCell MO instance 51 carrying the attribute cellId=2. The model also comprises an instance of the EnodeBFunction MO 54 modeling the RBS 65 with an attribute eNBId=1 indicating the identity of the eNodeB, and an instance of the SectorEquipmentFunction MO 52a-c for each transmission point managed by the RBS 65, i.e. for the three transmission points 66a-c. The SectorEquipmentFunction MO instances 52a-c are related to the corresponding SectorCarrier MO instances 53a-c. Furthermore, the MO model comprises an instance of the ExternalENodeBFunction MO 55a-c for each RBS managing a transmission point covering a subarea of Cell2, i.e. for the three RBSs 67a-c. The instances of the ExternalENodeBFunction MO 55a-c each comprises an attribute eNBId=x indicating the identity of the corresponding eNodeB. The three corresponding SectorCarrier MO instances 53d-f are related to these three ExternalENodeBFunction MO instances 55a-c respectively. The ExternalENodeBFunction MO may be referred to as the fourth MO.

Figure 8B:
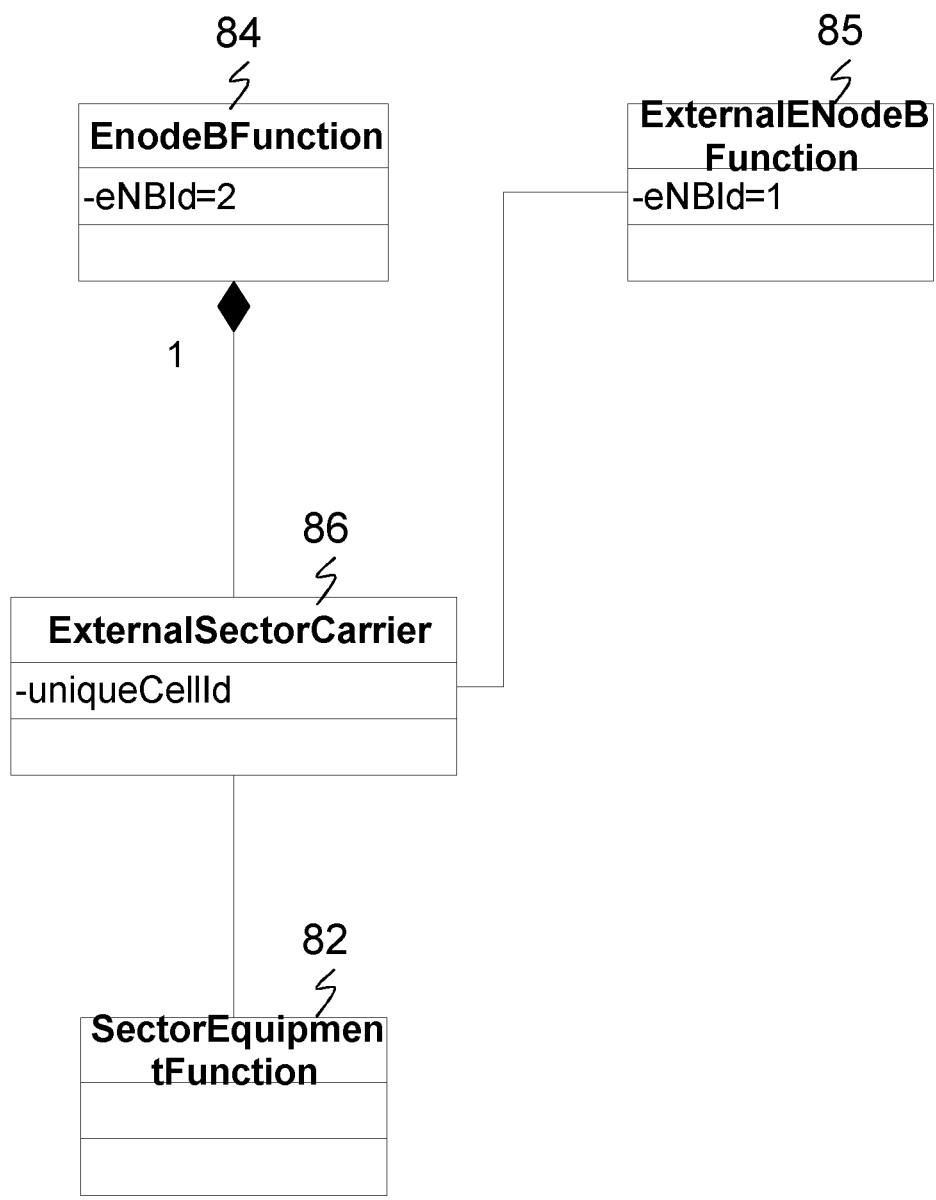

FIG. 8b illustrates the instantiated MO model in OAM 60b for the configuration in one of the RBSs 67a managing a transmission point or antenna used by Cell2. The model comprises an ENodeBFunction MO instance 84 modeling the RBS 67a and comprising an attribute eNBId=2 indicating the identity of the corresponding RBS 67a. The ENodeBFunction MO instance 84 is related to an instance of an ExternalSectorCarrier MO 86, also referred to as the fifth MO, modeling a subarea of the transmission point managed by the RBS 67a. The instance of the ExternalSectorCarrier MO 86 comprises a uniqueCellId attribute to couple it to Cell2. The ExternalSectorCarrier MO instance 86 is related to an instance of an ExternalENodeBFunction MO 85 which models the RBS 65 hosting the Cell2, and comprises an attribute eNBId=1 indicating the identity of the modeled RBS 65. The ExternalSectorCarrier MO instance 86 is also related to an instance of a SectorEquipmentFunction MO 82 modeling the equipment of the transmission point 68a. The examples described with reference to FIGS. 8a-b thus shows that it is possible to configure a cell using antenna resources in multiple RBSs.

Figure 9A:
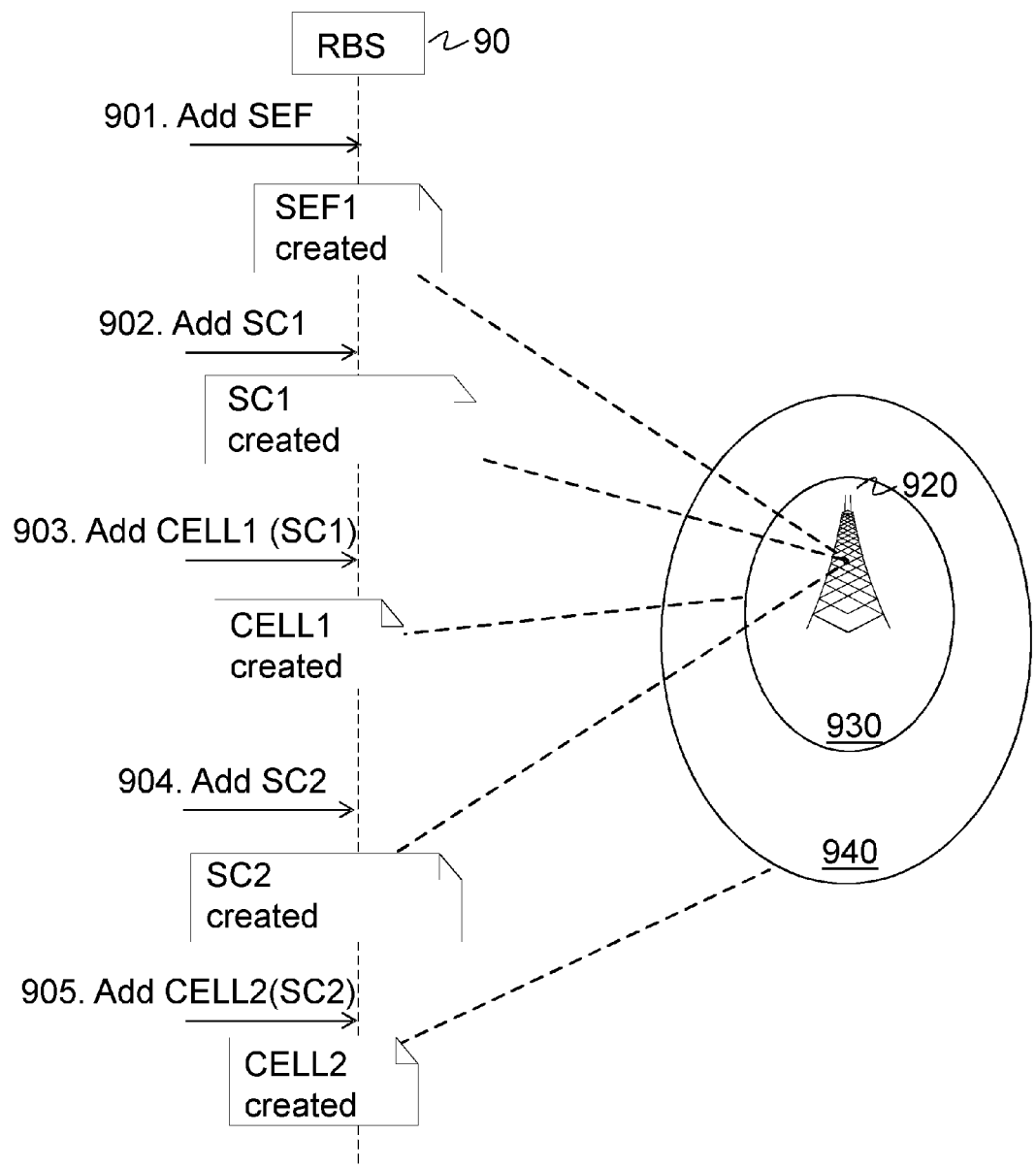
FIGS. 9a-b schematically illustrate the configuration of a deployment where two cells share the same physical equipment, and the corresponding instantiated MO model according to embodiments.

FIG. 9a is a signaling diagram illustrating a configuration of an RBS 90 for a cell deployment where two cells 930, 940, share the same physical equipment 920 such as radio unit, and antenna unit. The two cells 930, 940, may e.g. be e-UTRAN cells on different carrier frequencies or mixed mode cells of different standards. The following signals are sent from e.g. an OAM system to the RBS 90 as part of the configuration:

- 901: Add SEF—The RBS 90 is instructed to add a SectorEquipmentFunction MO instance (SEF) modeling the equipment of the transmission point 920. SEF1 is thus created in the instantiated MO model in the RBS 90.
- 902: Add SC1—The RBS is then instructed to add a first instance of the SectorCarrier MO (SC1) to model the subarea corresponding to the first cell 930, which is followed by a creation of SC1 in the RBS 90.
- 903: Add CELL1(SC1)—The RBS is instructed to add an instance of a cell MO (CELL1) related to SC1, and CELL1 is thus created in the RBS 90.
- 904: Add SC2—The RBS is instructed to add a second instance of the SectorCarrier MO (SC2) to model the subarea corresponding to the second cell 940, which is followed by a creation of SC2 in the RBS 90.
- 905: Add CELL2(SC2)—The RBS is instructed to add an instance of a cell MO (CELL2) related to SC2, and CELL2 is thus created in the RBS 90.

Figure 9B:
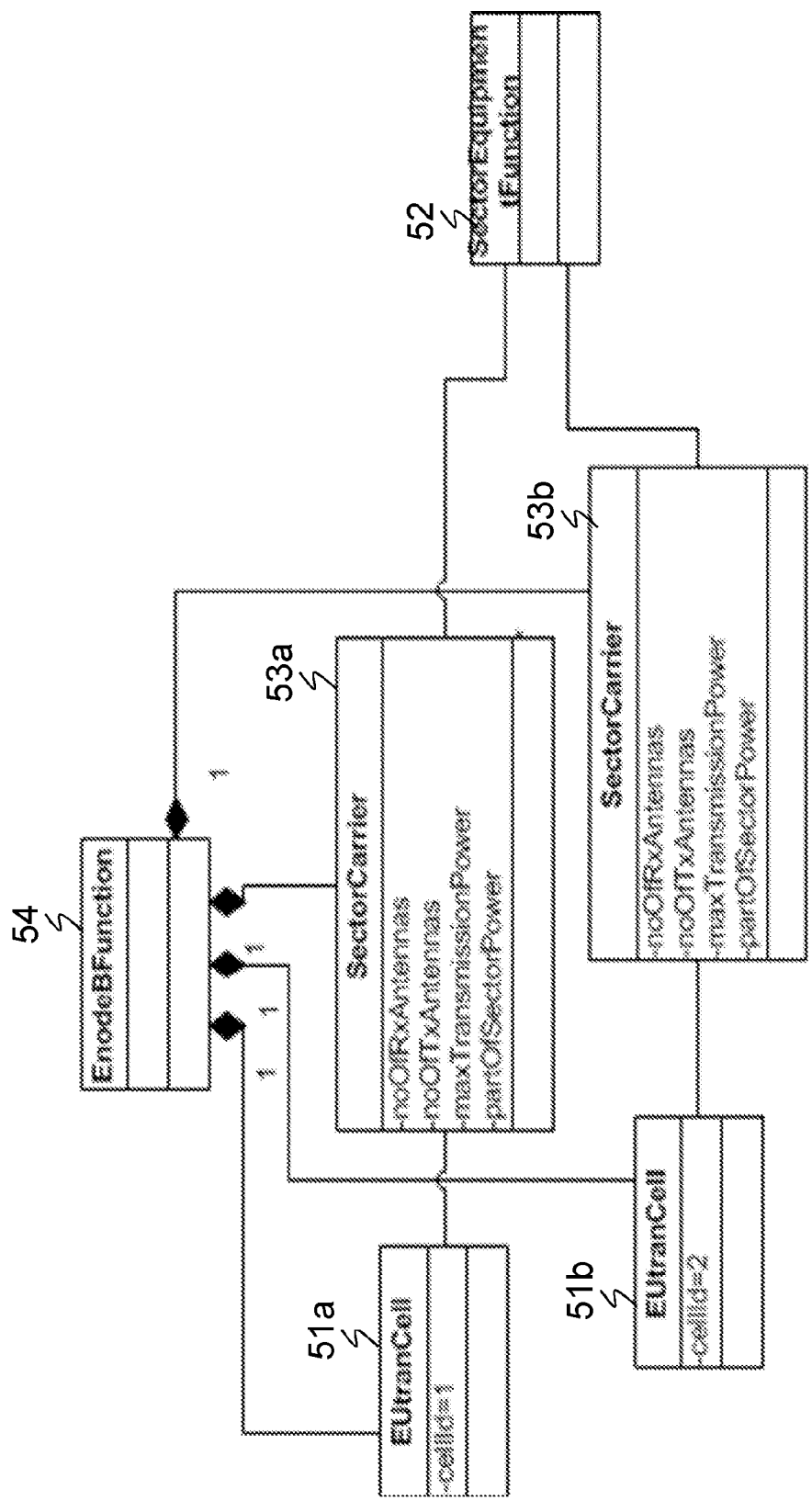

FIG. 9b illustrates an instantiated MO model with relations. The instantiated model is the result of the configuration illustrated in FIG. 9a. An ENodeBFunction MO instance 54 is related to the two instances of EUtranCell MO 51a-b, as well as to the two SectorCarrier MO instances 53a-b. Both SectorCarrier MO instances 53a-b are related to a same SectorEquipmentFunction MO instance 52, modeling the single transmission point equipment. As explained previously and illustrated in the FIG. 9b, the EUtranCell MO instances comprise an attribute cellId=x indicating the identity of the modeled cell, and the SectorCarrier MO instances comprise attributes (noOfRxAntennas, noOfTxAntennas, maxTransmissionPower, partOfSectorPower) which defines the usage of a set of physical equipment in a transmission point represented by the SectorEquipmentFunction MO instance. The example described above with reference to FIGS. 9a-b thus illustrates the flexibility of embodiments of the invention.

Figure 10:
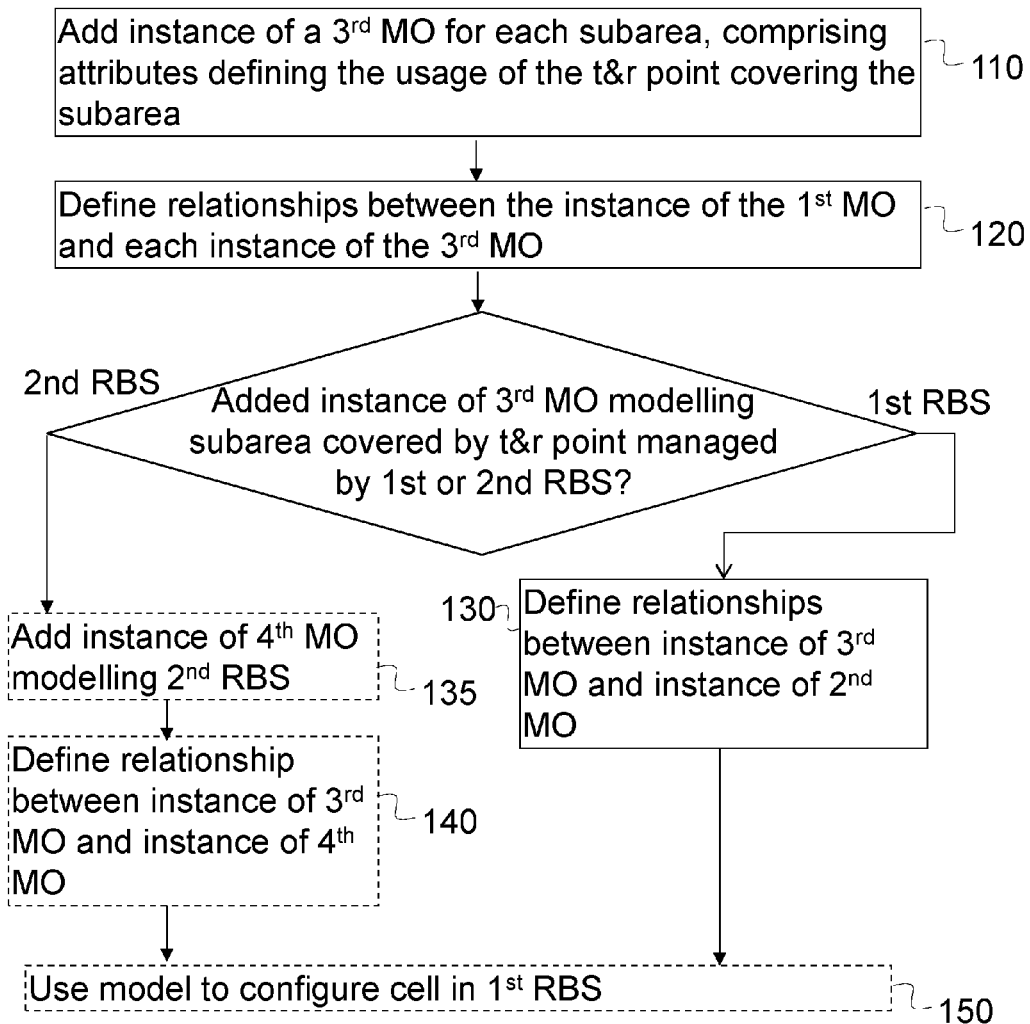
FIG. 10 is a flowchart schematically illustrating the method for configuring the MO models according to embodiments.

FIG. 10 is a flowchart illustrating embodiments of a method for configuring MO models for a cell hosted by a first RBS. The method steps in boxes with dotted lines are optional steps. The cell is served by a plurality of transmission and receiving (t&r) points, each t&r point covering a subarea of the cell. The cell is modeled by an instance of a first MO in a first MO model. The first MO model is the model that may be used to configure the cell in the first RBS. The first MO is referred to as the EUtranCell MO in the current 3GPP model for LTE. A set of equipment of each of said plurality of transmission and receiving points is modeled by an instance of a second MO in the first MO model. The second MO is referred to as the SectorEquipmentFunction MO in the current 3GPP model for LTE. The method comprises:

- 110: Adding to the first MO model an instance of a third MO for each subarea. The third MO is referred to as the SectorCarrier MO in the previous description. Each instance of the third MO comprises attributes defining the usage of the transmission and receiving point covering the subarea.
- 120: Defining relationships between the instance of the first MO and each instance of the third MOs.

When an added instance of the third MO is modeling a subarea covered by a transmission and receiving point managed by the first RBS, the method also comprises:

- 130: Defining a relationship between the added instance of the third MO and the instance of the second MO modeling the set of equipment of the transmission and receiving point covering the corresponding subarea.

The method may further optionally comprise when an added instance of the third MO is modeling a subarea covered by a t&r point managed by a second RBS:

- 135: Adding to the first MO model an instance of a fourth MO modeling the second RBS. The fourth MO has previously been referred to as the ExternalENodeBFunction MO.
- 140: Defining a relationship between the added instance of the third MO modeling the subarea covered by the t&r point managed by the second RBS, and the instance of the fourth MO.

The method may also comprise using 150 the first MO model to configure the cell in the first RBS.

The set of equipment of a t&r point may comprise at least one of a radio antenna, a tower mounted amplifier and a radio equipment. Furthermore, the attributes defining the usage of the t&r point may comprise at least one of a maximum transmission power, a number of receiving antennas, a number of transmitting antennas, a frequency, a transmission mode, and a state.

A second MO model may be created to model the cell's usage of the set of equipment of t&r points managed by the second RBS. The method may also comprise, in addition to the steps defined with reference to FIG. 10, one or more of the following steps:

Adding to the second MO model an instance of a fifth MO modeling a subarea of the cell which is covered by a transmission and receiving point managed by the second RBS. The fifth MO has previously been referred to as the ExternalSectorCarrier MO. The instance of the fifth MO comprises an attribute defining the identity of the cell.

Adding to the second MO model an instance of the fourth MO modeling the first RBS, which in the perspective of the second RBS is an ExternalENodeBFunction. An instance of the second MO is also added, modeling a set of equipment of the transmission and receiving point managed by the second RBS.

Defining a relationship between the instance of the fifth MO and the instance of the fourth MO, and between the instance of the fifth MO and the instance of the second MO.

Using the second MO model to configure, in the second RBS, the cell's usage of the set of equipment of the transmission and receiving point managed by the second RBS.

Figure 11:
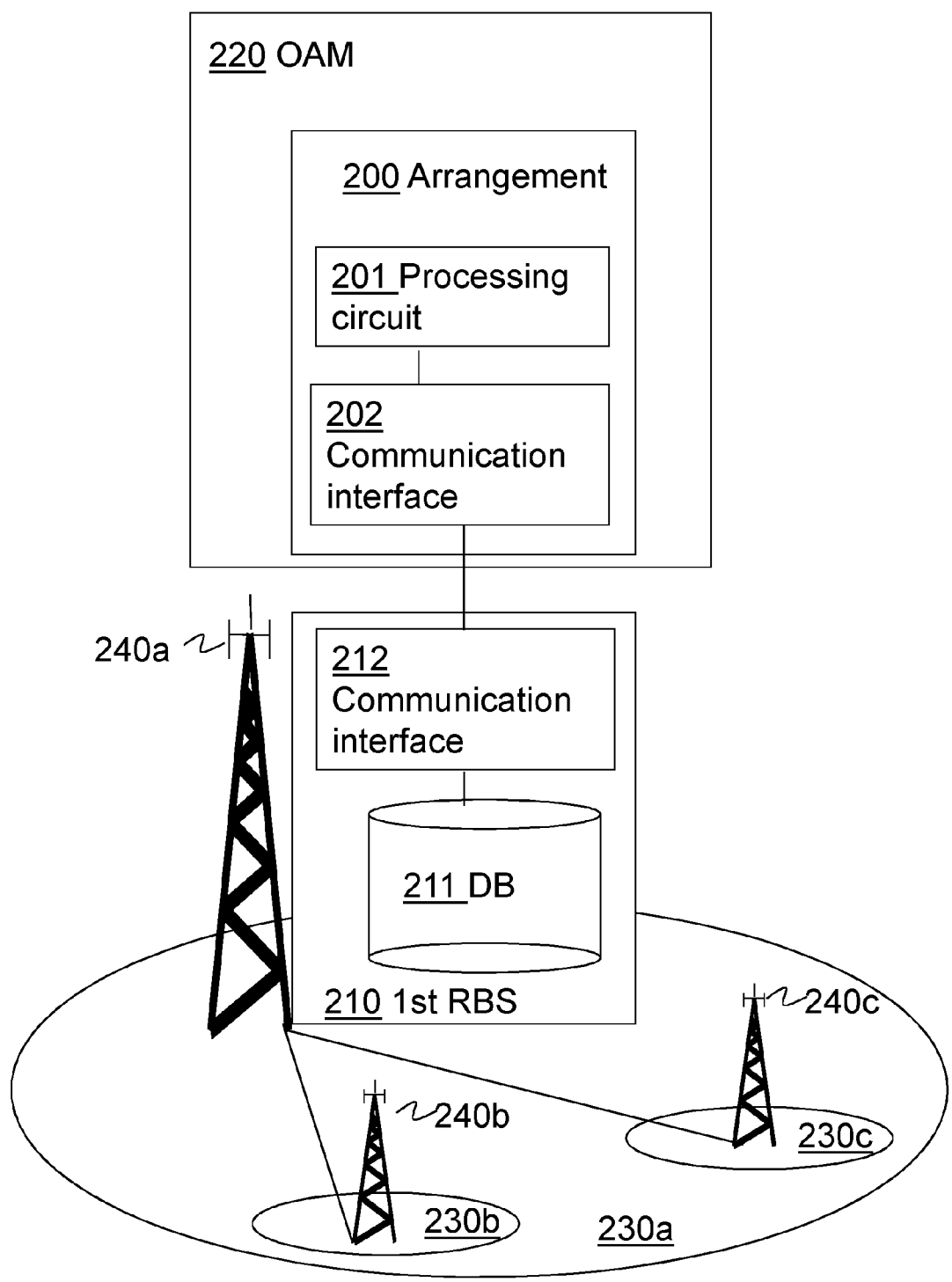
FIG. 11 is a block diagram schematically illustrating the arrangement for configuring the MO models according to embodiments.

An embodiment of an arrangement 200 for configuring MO models for a cell hosted by a first RBS 210, is schematically illustrated in the block diagram in FIG. 11. The arrangement is typically placed in an OAM system 220 which is connected at least to the first RBS 210. The cell is served by a plurality of transmission and receiving points, each transmission and receiving point covering a subarea 230a, 230b, 230c, of the cell. The cell is modeled by an instance of a first MO in a first MO model, and a set of equipment of each of said plurality of transmission and receiving points 240a, 240b, 240c, is modeled by an instance of a second MO in the first MO model. The set of equipment of a transmission and receiving point may comprise at least one of a radio antenna, a tower mounted amplifier and a radio equipment. The arrangement comprises a processing circuit 201 configured to add to the first MO model an instance of a third MO for each subarea, each instance of the third MO comprising attributes defining the usage of the transmission and receiving point covering the subarea. The attributes defining the usage of the transmission and receiving point may comprise at least one of a maximum transmission power, a number of receiving antennas, a number of transmitting antennas, a frequency, a transmission mode, and a state. The processing circuit 201 is further configured to define relationships between the instance of the first MO and each instance of the third MOs. The processing circuit 201 is also configured to define a relationship between an added instance of the third MO and the instance of the second MO modeling the set of equipment of the transmission and receiving point covering the corresponding subarea, when the added instance of the third MO is modeling a subarea covered by a transmission and receiving point managed by the first RBS.

In another embodiment of the invention, the processing circuit 201 may be further configured to add to the first MO model an instance of a fourth MO modeling the second RBS, and to define a relationship between the added instance of the third MO modeling the subarea covered by the transmission and receiving point managed by the second RBS and the instance of the fourth MO, when an added instance of a third MO is modeling a subarea covered by a transmission and receiving points managed by a second RBS.

In a further embodiment, the processing circuit 201 may be further configured to use the first MO model to configure the cell in the first RBS. The first MO model may be communicated to the first RBS 210 via a communication interface 202 in the arrangement 200, and a corresponding communication interface 212 in the first RBS, and stored in a configuration database (DB) 211 of the first RBS.

In still another embodiment, the processing circuit 201 may be further configured to add to a second MO model an instance of a fifth MO modeling a subarea of the cell which is covered by a transmission and receiving point managed by the second RBS. The instance of the fifth MO comprises an attribute defining the identity of the cell. The processing circuit may also be configured to add to the second MO model an instance of the fourth MO modeling the first RBS, and an instance of the second MO modeling a set of equipment of the transmission and receiving point managed by the second RBS. The processing circuit may be further configured to define a relationship between the instance of the fifth MO and the instance of the fourth MO, and between the instance of the fifth MO and the instance of the second MO. Finally, the processing unit may be configured to use the second MO model to configure, in the second RBS, the cell's usage of the set of equipment of the transmission and receiving point managed by the second RBS. The arrangement 200 may in this embodiment communicate with the second RBS in a similar way as with the first RBS as explained above.

In an alternative way to describe the embodiments illustrated in FIG. 11, the arrangement 200 comprises a Central Processing Unit (CPU) which may be a single unit or a plurality of units. Furthermore, the arrangement 200 comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which, when run on the arrangement 200, causes the CPU to perform steps of the procedure described earlier in conjunction with FIG. 10. In other words, when said code means is run on the CPU, it corresponds to the processing circuit 201 in the arrangement of FIG. 11.

The above mentioned and described embodiments are only given as examples and should not be limiting. Other solutions, uses, objectives, and functions within the scope of the accompanying patent claims may be possible.

The invention claimed is:

1. A method for configuring managed object, MO, models for a cell hosted by a first radio base station, wherein the cell is served by a plurality of transmission and receiving points, each transmission and receiving point covering a subarea of the cell, and wherein the cell is modelled by an instance of a first MO in a first MO model, and a set of equipment of each of said plurality of transmission and receiving points is modelled by an instance of a second MO in the first MO model, the method comprising:

adding to the first MO model an instance of a third MO for each subarea, each instance of the third MO comprising attributes defining the usage of the transmission and receiving point covering the subarea, defining relationships between the instance of the first MO and each instance of the third MOs, and when an added instance of the third MO is modelling a subarea covered by a transmission and receiving point managed by the first radio base station,
   defining a relationship between the added instance of the third MO and the instance of the second MO modelling the set of equipment of the transmission and receiving point covering the corresponding subarea.

2. The method according to claim 1, the method further comprising when an added instance of the third MO is modelling a subarea covered by a transmission and receiving points managed by a second radio base station:
   adding to the first MO model an instance of a fourth MO modelling the second radio base station,
   defining a relationship between the added instance of the third MO modelling the subarea covered by the transmission and receiving point managed by the second radio base station, and the instance of the fourth MO.

3. The method according to claim 1, further comprising using (150) the first MO model to configure the cell in the first radio base station.

4. The method according to claim 1, wherein the set of equipment of a transmission and receiving point comprises at least one of a radio antenna, a tower mounted amplifier and a radio equipment.

5. The method according to claim 1, wherein the attributes defining the usage of the transmission and receiving point comprises at least one of a maximum transmission power, a number of receiving antennas, a number of transmitting antennas, a frequency, a transmission mode, and a state.

6. The method according to claim 2, further comprising:
   adding to a second MO model an instance of a fifth MO modelling a subarea of the cell which is covered by a transmission and receiving point managed by the second radio base station, wherein the instance of the fifth MO comprises an attribute defining the identity of the cell,
   adding to the second MO model an instance of the fourth MO modelling the first radio base station, and an instance of the second MO modelling a set of equipment of the transmission and receiving point managed by the second radio base station,
   defining a relationship between the instance of the fifth MO and the instance of the fourth MO, and between the instance of the fifth MO and the instance of the second MO,
   using the second MO model to configure, in the second radio base station, the cell's usage of the set of equipment of the transmission and receiving point managed by the second radio base station.

7. An arrangement for configuring managed object, MO, models for a cell hosted by a first radio base station, wherein the cell is served by a plurality of transmission and receiving points, each transmission and receiving point covering a subarea of the cell, and wherein the cell is modelled by an instance of a first MO in a first MO model, and a set of equipment of each of said plurality of transmission and receiving points is modelled by an instance of a second MO in the first MO model, the arrangement comprising a processing circuit configured to:
   add to the first MO model an instance of a third MO for each subarea, each instance of the third MO comprising attributes defining the usage of the transmission and receiving point covering the subarea,
   define relationships between the instance of the first MO and each instance of the third MOs, and
   define a relationship between an added instance of the third MO and the instance of the second MO modelling the set of equipment of the transmission and receiving point covering the corresponding subarea, when the added instance of the third MO is modelling a subarea covered by a transmission and receiving point managed by the first radio base station.

8. The arrangement according to claim 7, the processing circuit being further configured to:
   add to the first MO model an instance of a fourth MO modelling the second radio base station, and
   define a relationship between the added instance of the third MO modelling the subarea covered by the transmission and receiving point managed by the second radio base station and the instance of the fourth MO,
   when an added instance of a third MO is modelling a subarea covered by a transmission and receiving points managed by a second radio base station.

9. The arrangement according to claim 7, wherein the processing circuit is further configured to use the first MO model to configure the cell in the first radio base station.

10. The arrangement according to claim 7, wherein the set of equipment of a transmission and receiving point comprises at least one of a radio antenna, a tower mounted amplifier and a radio equipment.

11. The arrangement according to claim 7, wherein the attributes defining the usage of the transmission and receiving point comprises at least one of a maximum transmission power, a number of receiving antennas, a number of transmitting antennas, a frequency, a transmission mode, and a state.

12. The arrangement according to claim 8, wherein the processing circuit is further configured to:
   add to a second MO model an instance of a fifth MO modelling a subarea of the cell which is covered by a transmission and receiving point managed by the second radio base station, wherein the instance of the fifth MO comprises an attribute defining the identity of the cell,
   add to the second MO model an instance of the fourth MO modelling the first radio base station, and an instance of the second MO modelling a set of equipment of the transmission and receiving point managed by the second radio base station,
   define a relationship between the instance of the fifth MO and the instance of the fourth MO, and between the instance of the fifth MO and the instance of the second MO, and
   use the second MO model to configure, in the second radio base station, the cell's usage of the set of equipment of the transmission and receiving point managed by the second radio base station.

* * * * *